United States Patent
Hiltunen

(10) Patent No.: US 8,983,491 B2
(45) Date of Patent: Mar. 17, 2015

(54) ADAPTIVE LOCATION TRACKING SYSTEM

(75) Inventor: Antti Hiltunen, Oulu (FI)

(73) Assignee: 9Solutions Oy, Oulu (FI)

( * ) Notice: Subject to any disclaimer, the term of this patent is extended or adjusted under 35 U.S.C. 154(b) by 165 days.

(21) Appl. No.: 13/601,440

(22) Filed: Aug. 31, 2012

(65) Prior Publication Data

US 2014/0213279 A1 Jul. 31, 2014

(30) Foreign Application Priority Data

Sep. 1, 2011 (EP) .................................. 11179724

(51) Int. Cl.
- H04W 24/00 (2009.01)
- G08B 1/08 (2006.01)
- H04W 64/00 (2009.01)
- G01S 1/02 (2010.01)
- G01S 5/00 (2006.01)

(52) U.S. Cl.
CPC .............. H04W 64/00 (2013.01); G01S 1/024 (2013.01); G01S 5/0081 (2013.01)
USPC .................. 455/456.1; 340/539.11

(58) Field of Classification Search
CPC ............................... H04W 4/02; H04W 16/04
USPC ............ 455/456.1, 3.02, 456.3, 456.2, 509; 370/327, 252, 338; 340/539.11, 572.1, 340/573.1, 551
See application file for complete search history.

(56) References Cited

U.S. PATENT DOCUMENTS

| | | | |
|---|---|---|---|
| 5,365,516 A | 11/1994 | Jandrell | |
| 6,915,135 B1 | 7/2005 | McKee et al. | |
| 8,294,568 B2 * | 10/2012 | Barrett | 340/539.11 |
| 2003/0018534 A1 | 1/2003 | Zack et al. | |
| 2005/0026611 A1 | 2/2005 | Backes | |
| 2009/0005064 A1 | 1/2009 | Malik et al. | |
| 2009/0273465 A1 * | 11/2009 | Shamir et al. | 340/539.1 |
| 2010/0113006 A1 * | 5/2010 | Pajjuri et al. | 455/423 |

FOREIGN PATENT DOCUMENTS

| | | |
|---|---|---|
| EP | 2 341 359 A1 | 7/2011 |
| WO | 01/76093 A1 | 10/2001 |
| WO | 2007/070103 A1 | 6/2007 |
| WO | 2010/097323 A1 | 9/2010 |

OTHER PUBLICATIONS

European Search Report for EP 1179724.7 dated Jan. 30, 2012.

* cited by examiner

*Primary Examiner* — Kiet Doan
(74) *Attorney, Agent, or Firm* — Sughrue Mion, PLLC

(57) ABSTRACT

This document presents a location tracking system comprising a plurality of location tracking nodes disposed to cover an area where the location tracking is to be carried out, at least one mobile tag configured to communicate with at least one of said plurality of location tracking nodes at a time for location tracking purposes, and a control apparatus configured to control operational parameters of the plurality of location tracking nodes and the at least one mobile tag. The control apparatus and the plurality of location tracking nodes are configured to carry out an automatic calibration phase during operation of the location tracking system the location tracking nodes transmit and receive test signals between the neighboring nodes, and report measurement results to the control apparatus. The control apparatus then optimizes the operation parameters of the location tracking system on the basis of received measurement reports.

12 Claims, 5 Drawing Sheets

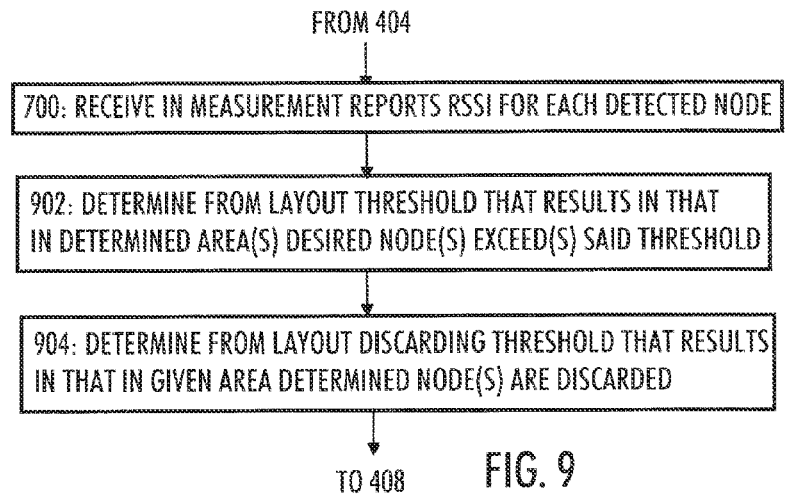
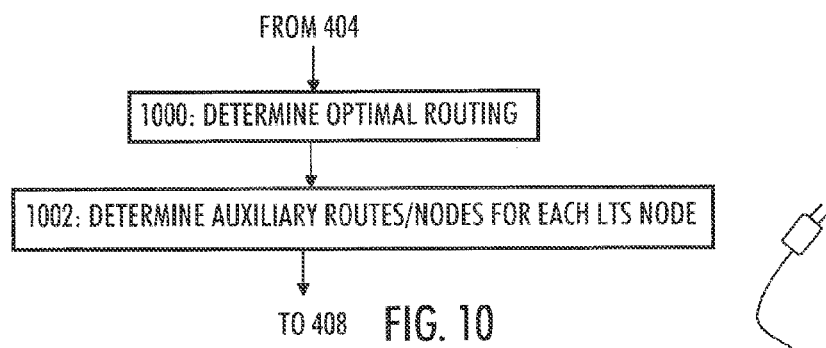
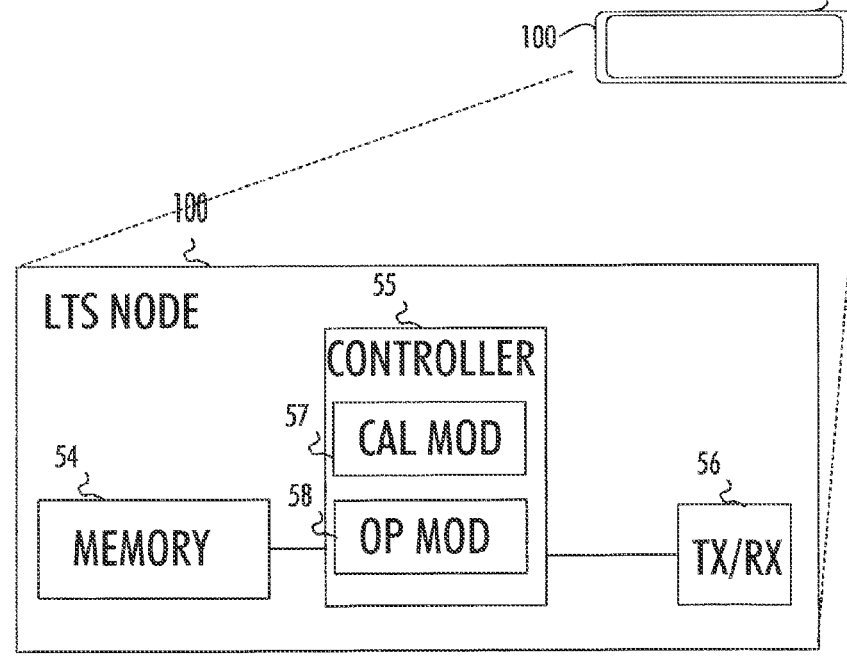

ADAPTIVE LOCATION TRACKING SYSTEM

FIELD

The invention relates to the technical field of location tracking systems.

BACKGROUND

Prior art teaches several types of location tracking systems. Satellite based tracking systems, e.g. Global Positioning System (GPS), are probably the most common location tracking systems. However, their problem is that they are not suitable for indoor location tracking, because GPS signals do not penetrate building walls. For indoors location tracking, prior art teaches systems that utilize a pico network of wireless base stations, and the location of a given person in the coverage area of the pico network is determined on the basis of which wireless base station currently serves a personal communication device of the person. Other prior art systems rely on radio frequency identification technology or other radio communication technology, wherein a plurality of nodes disposed throughout an area are used to track locations of mobile devices.

A problem with prior art systems is that they are designed to operate in an environment having properties that exist during an installation phase of the location tracking system. However, in many scenarios the environment is subject to constant changes, e.g. contents of a warehouse or a layout of a cubicle office may change all the time. This results in that objects appear and disappear in arbitrary locations in the area, which may cause dead zones in the area, for example.

BRIEF DESCRIPTION

According to an aspect of the present invention, there is provided a system for tracking location, comprising a plurality of location tracking nodes disposed to cover an area where the location tracking is to be carried out; at least one mobile tag configured to communicate with at least one of said plurality of location tracking nodes at a time for location tracking purposes; and a control apparatus configured to control operational parameters of the plurality of location tracking nodes and the at least one mobile tag. The control apparatus and the plurality of location tracking nodes are configured to carry out an automatic calibration phase during operation of the location tracking system, wherein the calibration phase comprises: transmitting a test signal with designated transmission power from one location tracking node; receiving the test signal in another location tracking node and determining the location tracking node that transmitted the test signal from the test signal; transmitting to the control apparatus a measurement report comprising an identifier of at least one location tracking node from which the test signal was received; receiving a plurality of measurement reports from a plurality of location tracking nodes in the control apparatus; and reconfiguring, by the control apparatus, at least some parameters of at least one location tracking node and/or at least one mobile tag on the basis of the received measurement reports.

According to another aspect, there is provided an apparatus for a location tracking system, comprising at least one processor; and at least one memory including a computer program code. The at least one memory and the computer program code are configured, with the at least one processor, to cause the apparatus to perform the following in an automatic calibration phase during operation of the location tracking system: transmit a test signal with at least one designated transmission power from the location tracking node; receive another test signal from another location tracking node and determining the location tracking node that transmitted the other test signal from the test signal; transmit to a control apparatus a measurement report comprising an identifier of at least one location tracking node from which the test signal was received; receive reconfigured transmission power parameters from the control apparatus; and apply the received reconfigured transmission power parameters in communication with mobile tags tracked by the location tracking system.

According to another aspect, there is provided a control apparatus comprising at least one processor; and at least one memory including a computer program code. The at least one memory and the computer program code are configured, with the at least one processor, to cause the apparatus to control operational parameters of a location tracking system comprising a plurality of location tracking nodes disposed to cover an area where the location tracking is to be carried out and at least one mobile tag configured to communicate with at least one of said plurality of location tracking nodes at a time for location tracking purposes, to carry out an automatic calibration phase during operation of the location tracking system, the calibration phase comprising transmission of test signals with designated transmission power levels between said plurality of location tracking nodes, to receive during the calibration phase from the plurality of location tracking nodes measurement reports, wherein a measurement report comprises an identifier of at least one location tracking node from which the test signal was received by a location tracking node which transmitted said measurement report, to analyze said plurality of measurement reports, and to reconfigure at least some parameters of at least one location tracking node and/or at least one mobile tag on the basis of the analysis.

Embodiments of the invention are defined in the dependent claims.

LIST OF DRAWINGS

Embodiments of the present invention are described below, by way of example only, with reference to the accompanying drawings, in which FIG. 1 illustrates a layout of an area where location tracking is carried out and coverage of a tracking system according to an embodiment of the invention;

FIGS. 5 to 10 illustrate embodiments for determining and reconfiguring operational parameters of the location tracking system during the calibration phase; and FIGS. 11 to 13 illustrate apparatuses according to embodiments of the invention.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
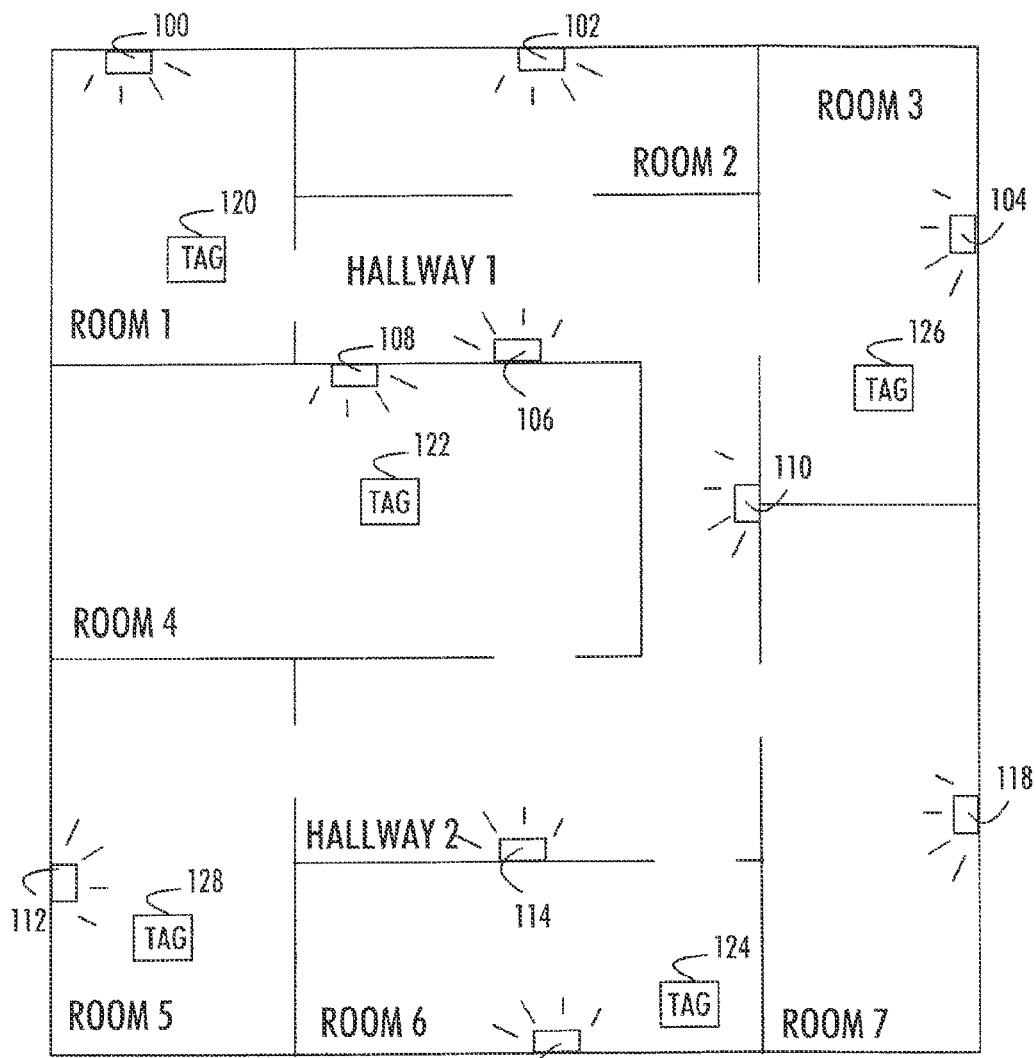

FIG. 1 illustrates an exemplary layout of a building to which embodiments of a location tracking system (LTS) may be applied. The embodiments are particularly suitable for indoor location tracking, but the invention may equally be utilized in outdoor applications. The layout of FIG. 1 illustrates a number of rooms with doors illustrated by discontinuations in the room walls, and a hallway providing access from one room to another. People inside the building that are being location-tracked are represented by their user equipment or, as from now on called, mobile tags 120, 122, 124, 126, and 128.

The location tracking is enabled by disposing a plurality of location tracking nodes (or LTS nodes) 100 to 118 throughout the building where the location tracking is to be carried out. The LTS nodes 100 to 118 may be radio communication devices, each configured to provide a coverage area effectively defined by transmission power, for example, and the combined coverage areas of the LTS nodes 100 to 118 cover the location tracking area. The LTS nodes 100 to 118 may also form a mesh network enabling data routing between the nodes 100 to 118 and through the nodes 100 to 118. A location tracking apparatus or a module that may be comprised in a server may be connected to the network of LTS nodes 100 to 118, and the location tracking apparatus may be configured to maintain locations of tracked objects and control the location tracking and other features of the LTS. The server and the location tracking apparatus may be realized by a computer provided with suitable communication equipment so as to enable a communication connection with the LTS nodes 100 to 118. The server may be connected to a router via an Internet Protocol (IP) connection, and the router may be configured to connect to the mesh network of LTS nodes 100 to 118 through another connection type. The connection in the mesh network of LTS nodes 100 to 118 may be configured to establish the mesh network according to a Bluetooth technology, but it should be understood that other radio communication schemes may be used as well.

The locations of objects are tracked by tracking movement of tags 120 to 128 attached to the objects. As examples of the tags 120 to 128, a user tag may be carried by a person, and an asset tag may be attached to an asset. The asset may be any mobile or portable apparatus that is wanted to be tracked, e.g. a wheelchair, a computer, or expensive industrial testing equipment. The asset tag may equally be attached to a fixed apparatus, e.g. a safe, a projector, in order to detect attempted robbery. The different tags 120 to 128 whose movement and location are tracked may be called generally mobile tags, although some of the tags 120 to 128 may actually be in a substantially fixed position. The location tracking may be based on a scheme where a mobile tag is configured to detect the closest LTS node and to transmit to the server periodically a message comprising an identifier of the mobile tag and an identifier of the detected closest LTS node, or a plurality of detected LTS nodes. The message may be routed through the mesh network of LTS nodes 100 to 118 to the server 106. As the server 106 is provided with information on fixed locations of the LTS nodes, e.g. in a layout of the area, the server is able to associate the mobile tag with the LTS node on the basis of the received message and, thus, determine the location of the mobile tag and the object associated with the mobile tag. In another embodiment, an LTS node is configured to detect mobile tags in its coverage area and transmit periodically identifiers of detected mobile tags to the server. Similarly, the server may then determine the location of each mobile tag on the basis of the LTS nodes that have detected the mobile tag. The detection of the LTS nodes or mobile tags may be based on Bluetooth inquiry procedure. The LTS may, however, utilize another location tracking scheme and/or another communication scheme.

The apparatus carrying out the detection and reporting to the server, e.g. an LTS node detecting mobile tags or a mobile tag detecting LTS nodes, may be configured in a detection procedure to report a closest detected apparatus (as determined by the highest estimated reception power), a determined number of closest detected apparatuses, or all the detected apparatuses. The detection may include at least one threshold in the apparatus reporting the detection, e.g. a LTS node or a mobile tag. The threshold may be a rapid detection threshold, and a mobile tag may be configured to estimate a received signal strength indicator (RSSI) or another metric proportional to a reception power for a signal received from an LTS node. If the RSSI exceeds the rapid detection threshold, the mobile tag may instantly link to the LTS node without waiting for further signals from other LTS nodes. This speeds up the positioning and reduces operations carried out in the mobile tag, thereby also reducing power consumption. If the RSSI is below the rapid detection threshold, the mobile tag may be configured to continue the detection procedure by attempting to detect other LTS nodes and then collectively transmit to the server a message comprising identifiers of the detected LTS nodes. The operation is similar when the LTS attempts to detect the mobile tags and applies the rapid detection threshold. Another example of the threshold is a discarding threshold, wherein those apparatuses that are detected but whose RSSI is below the discarding threshold are discarded from the report. This eliminates reporting and possible positioning to LTS nodes that are far from the mobile tag. For example with reference to FIG. 1, if for some reason a mobile tag 128 does not detect any one of the closest LTS nodes 112, 114, 116 because of some malfunction or coverage issue, the mobile tag 128 may be configured to discard a signal received from LTS nodes 118 and 108 because of the discarding threshold. As a consequence, the mobile tag 128 reattempts the detection instead of reporting the LTS nodes that are too far away, thus preventing erroneous positioning.

Figure 2:
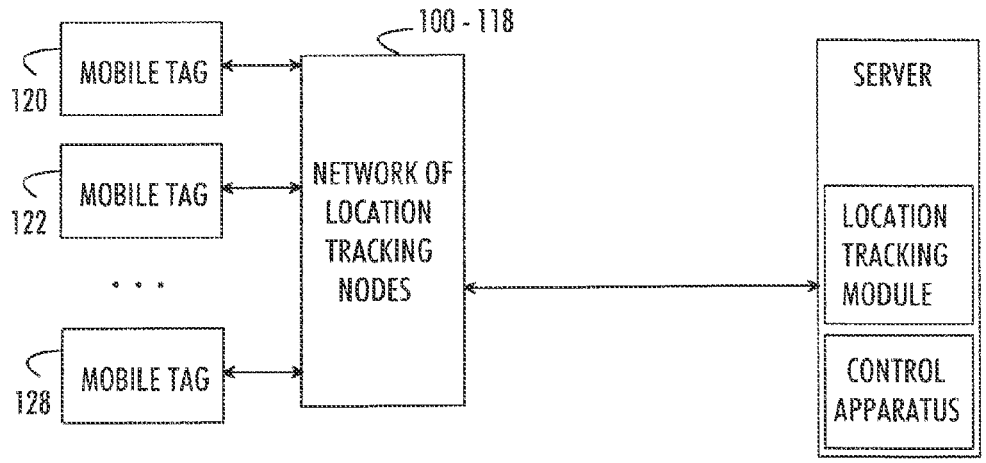
FIG. 2 illustrates communication between elements according to an embodiment of the invention.

FIG. 2 illustrates examples of routing signals between the elements of the system according to an embodiment of the present invention. As already mentioned, the LTS node(s) 100 to 118 may transmit their unique identifiers (IDs) by utilizing Bluetooth inquiry response messages or other connectionless means for radio transmitting/broadcasting a unique identifier without establishing an actual radio connection. The LTS nodes 100 to 118 may also form a mesh network used for routing messages in the LTS between the server and the mobile tags 120 to 128 and/or the LTS nodes 100 to 118. The mobile tag(s) 120 to 128 detecting the radio transmissions/broadcasts of the LTS nodes 100 to 118 may forward the detected unique identifiers to the server over the mesh network of LTS nodes configured to route signals through the mesh network to the server. One or more of the LTS nodes may be connected to a wired network, e.g. Ethernet, so as to connect to the server. The connection to the wired network may be realized by providing a router apparatus providing a wireless connection with the mesh network through at least one LTS node and the wired connection to the server. If the server is located in a remote location, the connection between the base station network and the server may be routed through the Internet. The mesh network may be based on Bluetooth mesh network technology. Other embodiments may utilize other communication technologies to implement the mesh network, such as IEEE 802.11x (WiFi).

The server may comprise a location tracking apparatus configured to monitor for the locations of the mobile tags 120 to 128. The server may additionally comprise a control apparatus or a control module configured to control operational parameters of the LTS. The control apparatus may monitor and control the transmission powers and other communication parameters, control detection parameters such as the above-mentioned threshold(s), resolve link failures, etc.

As mentioned in the Background section, the operational environment around the LTS may be subject to changes because of movement of objects and structures, e.g. furniture and walls. For example, in a large warehouse appearance or disappearance of a large container may dramatically change the radio environment which may change the reliability of the location tracking by creating dead spots in the coverage or by causing detection of unnecessarily large number of LTS nodes. For example, the change in the environment may create a line-of-sight between a mobile tag and a remote LTS node, while an LTS node close to the mobile tag is blocked by a newly placed object. To account for such changes in the operational environment, the LTS according an embodiment of the invention carries out a calibration phase during the operation of the LTS. In the calibration phase, the LTS is configured to adapt to the changing environment by first sensing the channel(s) between the LTS nodes by transmitting test signals and then adapting the parameter of the LTS nodes and/or the mobile tags accordingly. The calibration phase may be initiated by the control apparatus, and the initiation may be time-based and set by an operator to be carried out during night-time, for example. In another embodiment, the control apparatus may initiate the calibration phase upon detection a possible degradation in the reliability of the location tracking. For example, if a given mobile tag cannot be tracked, its location shifts too rapidly back-and-forth between given LTS nodes, or location tracking problems occur in a determined area, the calibration phase may be triggered. The calibration phase may be carried throughout the system, or only some of the LTS nodes may be configured to carry out the calibration phase, e.g. LTS nodes in a determined area.

Figure 3:
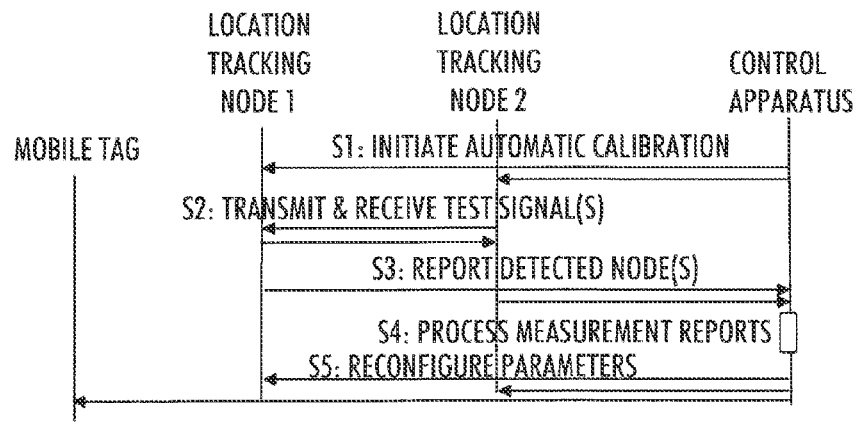
FIG. 3 is a signaling diagram illustrating an automatic calibration procedure according to an embodiment of the invention.
Figure 4:
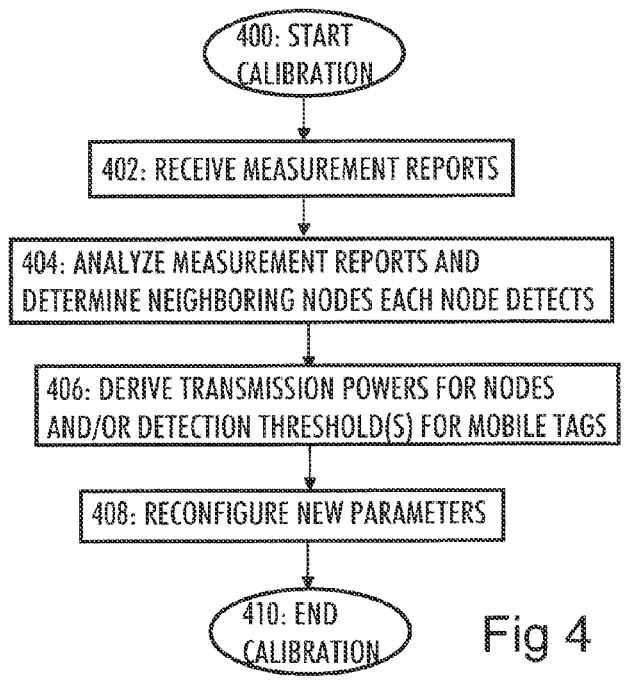
FIG. 4 illustrates a flow diagram of a process for carrying out the automatic calibration phase in a control apparatus.

FIG. 3 illustrates a signaling diagram of the automatic calibration phase. FIG. 4 illustrates a flow diagram of the calibration phase from the viewpoint of the control apparatus. Referring to FIGS. 3 and 4, the control apparatus may determine to start the calibration phase in block 400, and it initiates the calibration phase by transmitting an appropriate command to the LTS nodes 1 and 2 through the mesh network of LTS nodes in S1. The calibration phase may be carried out after the system components have been installed and before the system is in operation. The calibration phase may also be carried out during the operation at determined time intervals and/or upon a determined event, e.g. a malfunction and a single or multiple link failures, in the operation of the system.

Upon reception of the calibration command from the control apparatus the LTS nodes 1 and 2 are configured to execute the calibration phase. In S2, the LTS nodes 1 and 2 transmit test signals with designated transmission powers. The LTS nodes may be configured to transmit the test signals with a preconfigured transmission power pattern comprising preset transmission powers that are used in a determined order, and the pattern may be repeated or, in general, the test signal may be transmitted with the same transmission powers a plurality of times. The control apparatus may control calibration periods such that each calibration period is carried out by using a given transmission power. The transmissions from the LTS nodes may be multiplexed in some manner, e.g. as controlled by the control apparatus, or by simply relying on the frequency-hopping of the Bluetooth, for example. The test signals are then received by (an)other LTS node(s), and the receiving LTS node may determine the LTS node that transmitted the test signal from the test signal. The test signals may comprise an identifier of the transmitter, e.g. a Bluetooth device number or another identifier. Referring to FIG. 3, the LTS node 1 may receive a test signal from the LTS node 2 and derive the identifier of the LTS node 2 from the received test signal. In some embodiments, the LTS node measures the RSSI or another reception power metric from the received test signal. Similarly, the LTS node 2 may receive a test signal from the LTS node 1 and derive the identifier of the LTS node 1 from the received test signal. Thereafter, the LTS nodes 1 and 2 may transmit further test signals and attempt to receive test signals from other LTS nodes.

In S3, the LTS nodes collect the identifiers of the detected LTS nodes into a measurement report and transmit the measurement report to the control apparatus. The control apparatus receives a plurality of measurement reports from the LTS nodes in S3 (block 402 in FIG. 4). Thereafter, a subsequent calibration period with a subsequent transmission power may be started. Alternatively, the next calibration period may be carried out before S3, and the LTS nodes may generate and transmit in S3 measurement reports that collectively identify the neighboring LTS nodes they have detected during each calibration period.

In S4, the control apparatus processes the received measurement reports. The control apparatus may determine for each LTS node the neighboring LTS nodes detected with each transmission power in block 404. From such information and/or other information derived from the measurement reports, the control apparatus may determine new parameters for the LTS nodes and/or the mobile tags block 406. It should be noted that in the calibration period each LTS node may be considered as simulating the mobile tag in the location of the LTS node and, therefore, the calibration phase according to embodiments of the invention may be used to derive the parameters also for the mobile tags. In S5 (block 408 in FIG. 4), the control apparatus reconfigures at least some parameters of at least one location tracking node and/or at least one mobile tag on the basis of the received measurement reports. The reconfiguration may include transmission of appropriate command messages defining the new parameters to the LTS nodes and the mobile tags. The transmission of the command messages to the mobile tags may be buffered and transmitted to the mobile tags when they establish a communication connection with the server. This may be carried out much later, for example if the calibration phase is carried out at night, and some of the mobile tags enter the coverage area of the LTS the next morning. The reconfigured parameters may include at least the transmission powers of the LTS nodes and/or the above-mentioned thresholds used in the location tracking. The parameters may be determined from the measurement reports according to a determined algorithm defined by rules, wherein the parameters are determined purely on the basis of the measurement reports, including optionally measured RSSI values, and/or on the basis of the layout of the LTS and locations of the LTS nodes. Embodiments for determining the transmission powers and the thresholds will be described below. The control apparatus ends the calibration phase in block 410.

Figure 5:
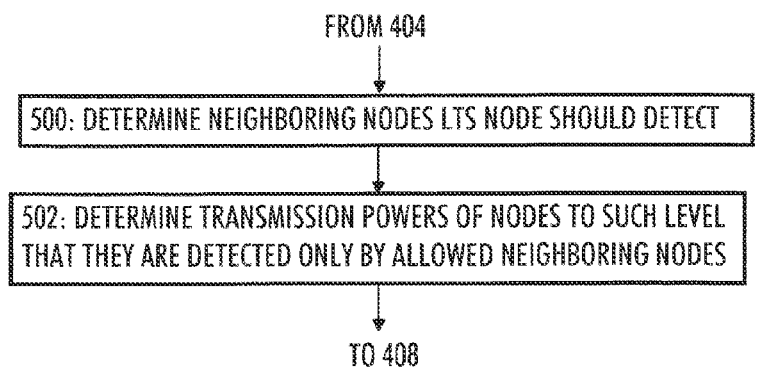

Let us now consider some embodiments for determining the operation parameters reconfigured by the control apparatus in the calibration phase. Such embodiments are illustrated by flow diagrams of FIGS. 5 to 9 which may be understood as embodiments for carrying out block 406 of FIG. 4. FIG. 5 illustrates a procedure for determining a transmission power for a given LTS node. The same procedure may be repeated for other LTS nodes. After carrying out block 404 of FIG. 4, the control apparatus may in block 500 determine from a memory storing rules for determining the parameters of the LTS the neighboring LTS nodes the LTS node should be able to detect. Then, the control apparatus determines from the measurement report received from the LTS node at which transmission power it is able to detect each neighboring node it should detect. In block 502, the control apparatus selects a transmission power to each neighboring node the LTS node should detect. The control apparatus may select for a neighbor LTS node the lowest transmission power that enables the detection of the neighbor LTS node in the LTS node in question. Similar procedure is carried out for the other LTS nodes. It should be noted that conflicts may occur, and selection of the lowest transmission power for a first LTS node that enables detection in a second LTS node may not be sufficient that the first LTS node is detected also in a third LTS node which should also detect the first LTS node. As a consequence, the control apparatus may be configured to raise the transmission power of the first LTS node to the lowest transmission power that enables detection of the first LTS node in all neighboring LTS nodes that should detect it. It should be noted that the lowest possible transmission power satisfying this criterion is used in order to avoid the detection of a given LTS node in too remote locations what comes to the location tracking. From block 502, the procedure proceeds to block 408 for configuration of the new transmission power parameters. In addition to the transmission power, the control apparatus may adjust antenna radiation pattern in some embodiments where the LTS nodes are provided with adjustable antenna patterns. This provides an additional dimension which enables better optimization of the coverage area of a given LTS node.

Figure 6:
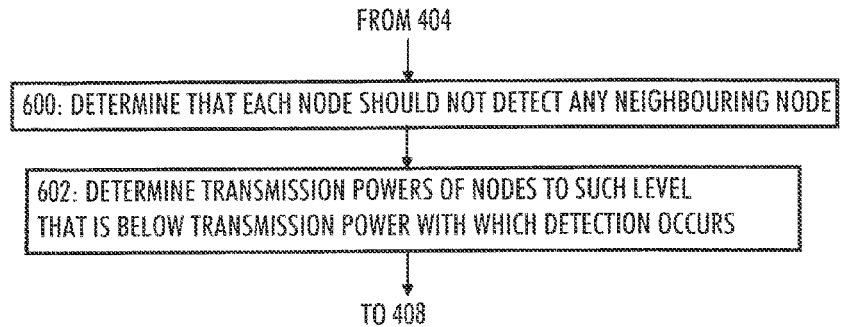

With respect to the location tracking purposes, e.g. communication between the LTS nodes and the mobile tags, it may be determined that neighboring LTS nodes should not detect each other's transmissions that relate to communication with the mobile tags. However, in order to maintain the mesh network, the LTS nodes should be able to detect at least one neighboring LTS node with respect to transmissions between the LTS nodes. FIG. 6 illustrates such an embodiment. After block 404, the process proceeds to block 600 in which the control apparatus acquires from a memory unit a rule that the transmission powers of transmissions between LTS nodes and mobile tags should be adjusted to such level that neighboring LTS nodes to not detect the transmissions. Therefore, in block 602 the control apparatus processes the measurement reports and determines for each LTS node a maximum transmission power with which no neighboring LTS node detects it. According to another criterion, the control apparatus may utilize the radio attenuation principle in which attenuation of the radio signal is proportional to the squared distance and select a transmission power that provides an LTS node with a coverage area that extends to a determined point between the LTS node and a neighboring LTS node. Such a point may be a half-way between the LTS nodes in which case the transmission power may be determined as ¼ of a lowest transmission power still detected in the neighboring LTS node. The control apparatus may then configure this transmission power for use in the communication between the LTS nodes and the mobile tags and another, higher transmission power for use in the communication between the LTS nodes.

Any one of the above-mentioned transmission powers configured by the control apparatus to be applied by the LTS nodes may be applied also to the mobile tags. For example, the mobile tag may be configured to apply the same transmission power configured to be used by the LTS node to which the mobile tag is currently linked. The transmission power may be signaled to the mobile tag by the control apparatus or the LTS node with which the mobile tag currently communicates.

Figure 7:
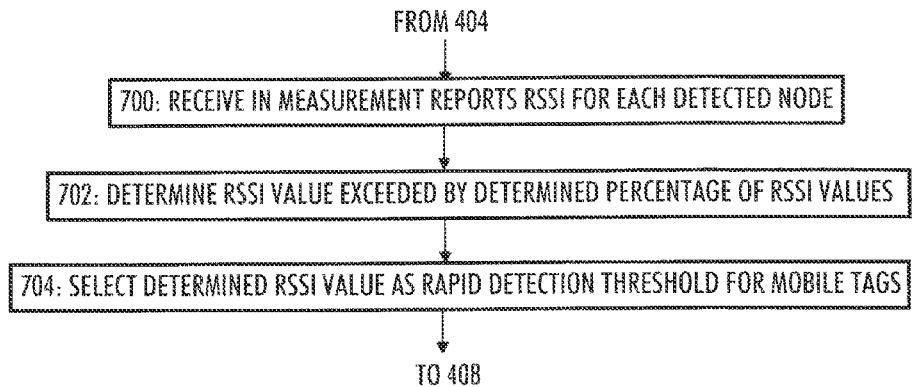
Figure 8:
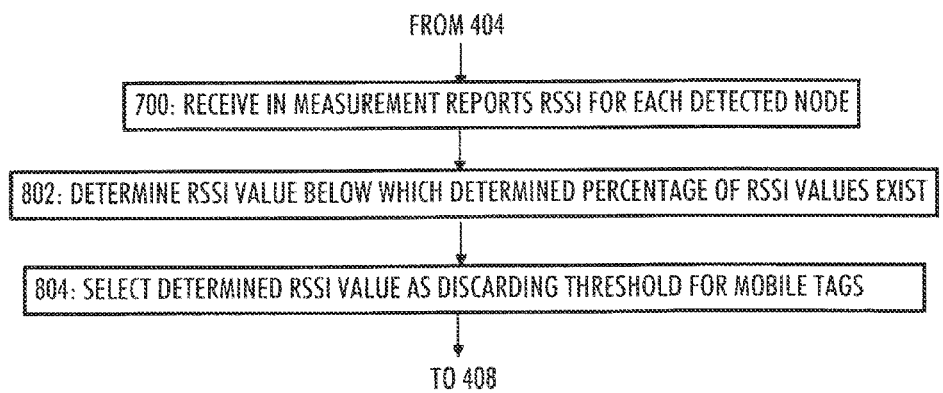

With respect to reconfiguration of the thresholds, e.g. the rapid detection threshold and the discarding threshold, FIGS. 7 to 9 illustrate processes for determining the thresholds. FIG. 7 illustrates a process for determining the rapid detection threshold. In the embodiments described below with reference to FIGS. 7 to 9, the LTS nodes carry out the measurement of the RSSI or another metric proportional to the reception power in the calibration phase. The LTS nodes also report to the control apparatus the measured RSSI values for each detected neighboring LTS node at each transmission power. The control apparatus then applies a statistical analysis algorithm to derive the threshold(s). In block 700, the control apparatus receives the measurement reports comprising the RSSI values. The control apparatus collects the RSSI values, wherein each RSSI value is linked to a determined transmission power associated with the measurement of that RSSI value. If the control apparatus reconfigures the transmission powers of the LTS nodes, it may do so at this point, and it may discard those RSSI values that are associated with transmission powers not to be utilized in the LTS as a result of the calibration. For example, if a given LTS node measures RSSI values $RSSI_1$, $RSSI_2$, and $RSSI_3$ for transmission powers $TP_1$, $TP_2$, and $TP_3$, respectively, from a neighboring LTS node, and the control apparatus configures the neighboring LTS node to apply $TP_2$, the control apparatus may discard $RSSI_1$ and $RSSI_3$. This removes from further analysis those RSSI values that are not actually used. It should be noted that each LTS node may compute a plurality of RSSI values for each transmission power of a given neighboring node so as to improve the statistical analysis.

In block 702, the control apparatus may determine an RSSI value that is exceeded by a determined percentage of remaining RSSI values. This may be carried out by sorting the RSSI values in an increasing (or decreasing order) and selecting an RSSI value that is exceeded by the determined percentage of RSSI values. This RSSI value is then selected as the rapid detection threshold in block 704. The percentage may be 20%, for example. Too high percentage results in that in many locations multiple detections above the rapid detection threshold occurs, which reduces the advantages of the rapid detection threshold, as it is required to determine which one of the LTS nodes exceeding the rapid detection threshold provides a higher RSSI value. On the other hand, too low percentage results in that in increasing number of locations no LTS node exceeds the rapid detection threshold. The percentage may be fine-tuned adaptively by the control apparatus during the operation of the LTS on the basis of the number of events where multiple LTS nodes exceed the threshold (in case of high number of such events the percentage is decreased) and the number of events when no LTS node exceeds the rapid detect threshold (in case of high number of such events the percentage is increased).

The selection of the discarding threshold follows a similar statistical procedure. Referring to FIG. 8, the control apparatus receives the measurement reports and the RSSI values in block 700. The RSSI values associated with transmission powers that are not used may be discarded in this case too. In block 802, the control apparatus may determine an RSSI value below which a determined percentage of remaining RSSI values exists. This may be carried out by sorting the RSSI values in an increasing (or decreasing order) and selecting an RSSI value below which there is the determined percentage of the RSSI values. This RSSI value is then selected as the discarding threshold in block 804. The percentage may be 20%, for example. Too high percentage may result in that some LTS nodes are discarded unnecessarily, while too low percentage may cause increased erroneous location tracking events, wherein a mobile tag is linked to a remote LTS node because of temporarily inability to detect a closer LTS node. This percentage may also be fine-tuned adaptively by the control apparatus during the operation of the LTS. For example, when a mobile tag bounces suddenly to a remote location which is not physically possible, and as suddenly returns close to its original location, and a sufficient number of such events occur, the control apparatus may determine to increase the percentage used in the determination of the discarding threshold. On the other hand, in case of difficulties in positioning the mobile tag in some areas may cause the control apparatus to decrease the percentage so that a higher number of LTS nodes will be taken into account when positioning a mobile tag.

The layout of the LTS and the locations of the LTS nodes may be used when determining the thresholds. The layout may be used in such manner that in a determined areas determined LTS nodes are desired to exceed the rapid detection threshold. Similarly for the discarding threshold, the layout may be used to determine a level where in determined areas determined remote LTS nodes will be discarded. Let us consider this closer with respect to FIG. 9. Again, the control apparatus receives the measurement reports and the RSSI values in block 700. The RSSI values associated with transmission powers that are not used may be discarded in this case too. In block 902, the control apparatus may process a measurement report of each LTS node at a time, determine for the LTS node the neighboring LTS node(s) that should exceed the rapid detection threshold and the neighboring LTS node(s) that should fall below the discarding threshold. The control apparatus may then select as the rapid detection threshold an RSSI value that fulfills this criterion, e.g. by selecting a rapid detection threshold level for which the desired neighbouring LTS nodes provide a higher RSSI value. In an embodiment, the control apparatus raises the rapid detection threshold from this RSSI value by a determined amount, because it is typically desired that at the location of a given LTS node (the one now being considered) only that LTS node exceeds the rapid detection threshold. The raised rapid detection threshold thus enables the rapid linking only to the LTS node when the mobile tag is very close to the LTS node, while further away from the LTS node the rapid linking to the desired neighboring node is achieved. The control apparatus may determine the degree how much to raise the rapid detection threshold from the distance between the LTS node and the neighboring LTS nodes, for example. Similarly for the discarding threshold, the control apparatus may select in block 904 as the discarding threshold an RSSI value that fulfills the above-mentioned criterion, e.g. by selecting a discarding threshold level for which the desired neighbouring LTS nodes provide a lower RSSI value. The discarding threshold may also be raised as described in connection with the rapid detection threshold.

In this manner, the control apparatus processes the other LTS nodes and obtains an aggregate value for the rapid detection threshold and the discarding threshold that may be achieved from the plurality of the candidate thresholds associated with different LTS nodes through averaging, for example. In other embodiments, the thresholds are made adaptive, e.g. different thresholds are linked to different LTS nodes. In the embodiments where the mobile tag carries out the RSSI estimation and detection of LTS nodes, the mobile tag may receive the current thresholds related to the currently linked LTS node from the LTS node or from the control apparatus.

In yet another embodiment of the invention, the control apparatus may determine and, optionally, reconfigure routing in the mesh network of LTS nodes in the calibration phase. For example, the control apparatus may reconfigure interconnections between the LTS nodes. Additionally, the control apparatus may reconfigure auxiliary routes that are applied when a primary route or routes fail. Let us assume that a first LTS node is configured to route data packets from or towards the server through a second LTS node and that an obstacle is suddenly placed between the first and the second LTS node, thus blocking the link. In the calibration phase, the control apparatus determines from the test signals that the first and the second LTS node no longer detect each other or that at least one better radio link is available for the first LTS node, e.g. through a third LTS node. Accordingly, the control apparatus may reconfigure the first LTS node to carry out routing through the third LTS node. FIG. 10 illustrates process modules for implementing this functionality in the control apparatus.

Referring to FIG. 10, after receiving the measurement reports, the process proceeds to block 1000 where the control apparatus determines optimal routing on the basis of the received measurement reports. The optimal routing may be determined in an algorithm where the control apparatus selects the routes according to qualities of radio channels between the LTS nodes, and the qualities may be determined from the received measurement reports indicating the neighboring LTS nodes each LTS node detects at each transmission power. If the system uses the RSSI measurements in the calibration phase, the RSSI values may be used in the route building algorithm as well. The control apparatus may establish routes between the LTS nodes with the criterion that maximizes the utilization of such links that provide the best radio channel quality, while ensuring a connection is provided to every LTS node. However, a high quality link may be discarded in the routing if another route provides a better overall link quality, e.g. the other route provides a higher number of high-quality links. The control apparatus may attempt to prefer certain network topology, e.g. a ring or a pipe, but it may equally derive the routing without emphasizing any network topology. In block 1002, the control apparatus determines at least one auxiliary route or auxiliary neighboring LTS node for each LTS node for use in case the primary route/node experiences a link failure because of a new obstacle etc. The control apparatus may select as an auxiliary node for a given LTS node a neighboring node that is not the primary node of the LTS node and that provides the highest link quality. The highest link quality may be determined from the measurement reports by selecting as the auxiliary node a node which is detected with the lowest transmission power by the LTS node to which the auxiliary node is being selected. Alternatively, the RSSI directly indicates the neighboring node providing the best link quality, e.g. the highest RSSI with a given transmission power. Accordingly, the routing configuration is another parameter that may be adaptively reconfigured by the control apparatus, and the LTS nodes are configured to adapt the new routes, i.e. connect to new neighboring LTS nodes, in response to the appropriate command from the control apparatus in block 408.

Figure 12:
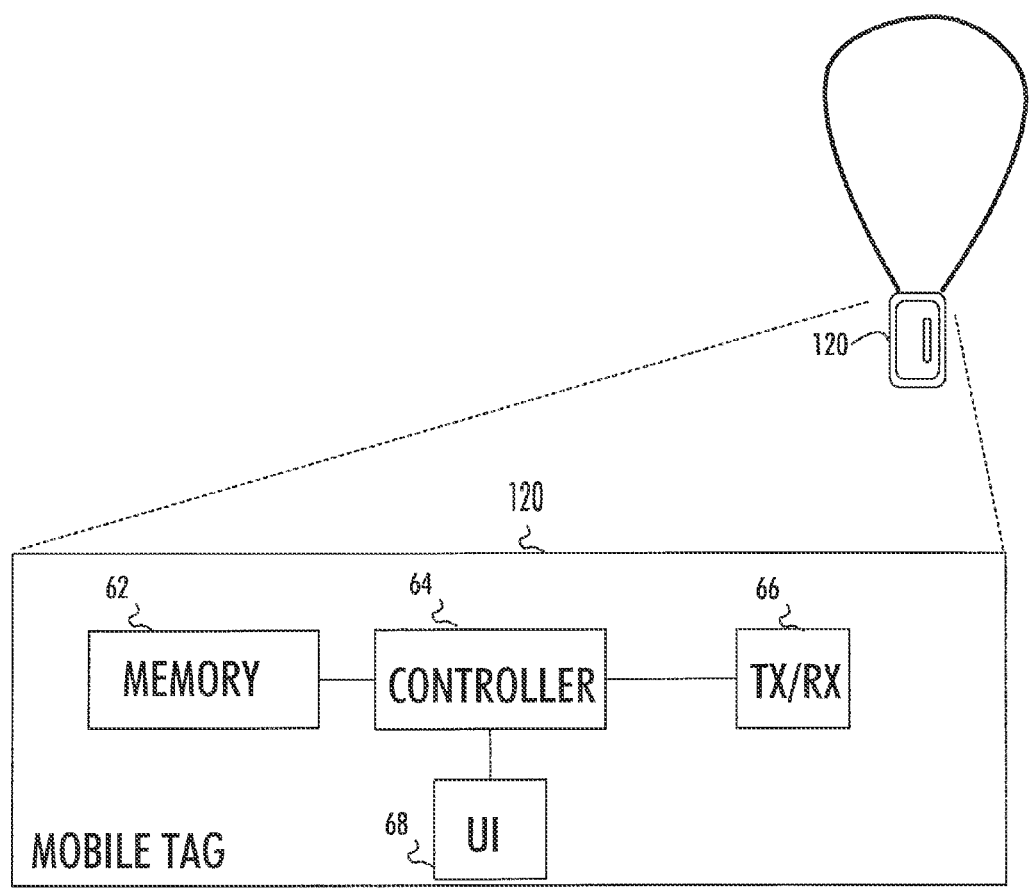

FIGS. 11 and 12 illustrate wireless communication devices according to embodiments of the invention. FIG. 11 illustrates an embodiment of the LTS node 100 to 118, which may be installed to a wall, ceiling, or to any other fixed or substantially fixed structure such that the location of the LTS node 100 will be static. The LTS node 100 may comprise a casing and a fixing mechanism used for attaching the access control apparatus 102 to the fixed structure. The LTS node 100 may be connected to a mains power source to provide the LTS node 100 with electric power, or the LTS node 100 may be battery-operated, or both. The LTS node 102 may comprise in the casing a communication circuitry 56 configured to carry out the communications with the server and the mobile tags, as described above. The communication circuitry 56 may support Bluetooth communication technology, for example. The communication circuitry 56 may also be understood to comprise means for providing the LTS node 100 with radio communication capability. In an embodiment, the communication circuitry 56 may be configured to apply a plurality of transmission power levels for the wireless communications, as described above.

The LTS node 100 further comprises a controller circuitry 55 configured to control the operation of the LTS node 100. The controller circuitry 55 may be configured to control the operation of the LTS node during conventional operation and during the above-mentioned calibration phase. The controller circuitry 55 may comprise an operational module 58 configured to control the operation of the LTS node 100 during the normal operation, e.g. control communication with the mobile tags and routing of data packets between the server and the mobile tags and the LTS nodes. The controller circuitry 55 may also comprise a calibration module 57 configured to control the operation of the LTS node 100 during the calibration phase. For example, in response to the reception of an activation signal from the server, the controller circuitry 55 may be configured to activate the calibration module 57 to initiate the calibration phase in which the calibration module controls the communication circuitry 56 to transmit the test signals with multiple transmission powers and receive test signals from the neighboring LTS nodes through the communication circuitry 56, to process the received test signals, and to construct the measurement reports, as described above. Then, the calibration module 57 is configured to receive through the communication circuitry 56 new operational parameters from the server/control apparatus and to store the new parameters in a memory unit 54. The parameters may include at least one of the transmission power for use in the communication with the mobile tags, routing configuration defining at least one neighboring LTS node to which the LTS node 100 should transmit data packets towards the server, and at least one neighboring LTS node to which the LTS node 100 should transmit data packets away from the server. The parameters may also include at least one auxiliary node to which the LTS node 100 is configured to connect in case of link failure. In some embodiments, the parameters and the control apparatus defines an auxiliary LTS node for each link used by the LTS node 100 and, therefore, the LTS node may receive a plurality of auxiliary nodes. After the calibration phase, the operational module 58 may be configured to read the new parameters from the memory 54 and apply them to normal operation of the LTS node.

The memory unit 54 of the LTS node 100 may store the operational parameters and computer program products configuring the operation of the controller circuitry 55.

FIG. 12 illustrates an embodiment of the mobile tag 120. The mobile tag 120 may comprise a casing and a strap used for attaching the mobile tag 120 around a neck or a wrist of a user in order to carry it conveniently. The mobile tag 120 may equally be attached to another personal electronic device carried or worn by the user, e.g. a mobile phone, a laptop, or apparel. The mobile tag 120 comprises a communication circuitry 66 configured to enable communication connections with the LTS nodes 100 to 118 and the server in order to carry out the location tracking and to receive and reconfigure operational parameters according to embodiments of the invention. The mobile tag 120 may further comprise a controller circuitry 64 configured to control the operations of the mobile tag 120 according to embodiments of the invention. The controller circuitry 64 may be configured to carry out the process according to any embodiment described above in connection with the mobile tag 120. For example, the controller circuitry may be configured to receive from the server new operational parameters, e.g. the threshold(s), and apply them to the location tracking. The controller circuitry 64 may comprise a processor configured by software read by the processor from a memory unit 62.

The mobile tag 120 may further comprise a user interface 68 comprising an input device such as a keypad or buttons, output means such as a loudspeaker and/or a visual interface, e.g. in the form of lights or a display unit. In an embodiment, the mobile tag 120 comprises an interface to be connected to a counterpart interface of another electronic device, e.g. a mobile phone or a computer (laptop). In such embodiments, the user interface 68 of the mobile tag 120 may utilize an expanded user interface provided by the other electronic device. For example, the mobile tag 120 itself may be provided with no display, but when the mobile tag 120 is connected to the other electronic device comprising a display, the controller circuitry 64 is configured to detect the connection and provide the user with a visual display, e.g. a menu, through the display of the electronic device. The controller circuitry 64 and the communication circuitry 66 in cooperation may be understood as forming means for carrying out the above-described functionalities of the mobile tag.

Figure 13:
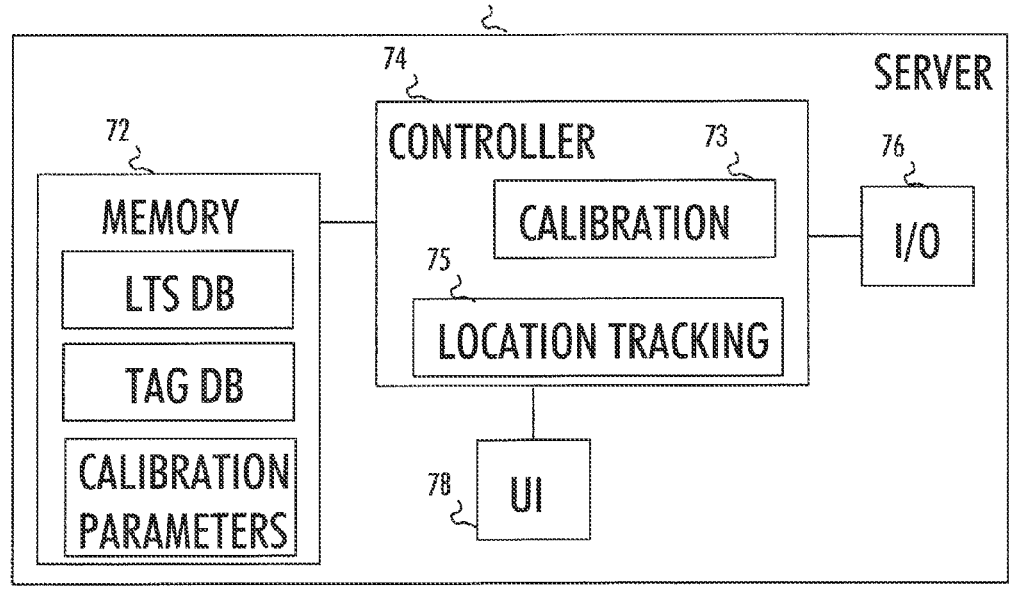

FIG. 13 illustrates a block diagram of an embodiment of the server 13 which may comprise the above-mentioned control apparatus. The server 13 comprises an input/output (I/O) interface 76 enabling a communication connection with the wireless communication devices of the LTS, e.g. the mobile tags 120 to 128, other tags, and LTS nodes 100 to 118. The I/O interface 76 may provide the server with Internet protocol connectivity. The server 13 may further comprise a controller circuitry 74 configured to carry out the embodiments described above in connection with the server 13. The controller circuitry 74 may comprise as a sub-circuitry a location tracking apparatus 75, which may be understood as a sub-routine or computer program configuring the controller circuitry 74 to carry out the functionalities of the location tracking apparatus 75. The location tracking apparatus may receive from the LTS nodes and/or the mobile tags reports related to linking the mobile tags to the LTS nodes for location tracking purposes. The location tracking apparatus may then store in a location tracking database in a memory unit 72 information on the mobile tags and an LTS node currently linked to each mobile tag. As another sub-circuitry, the controller circuitry 74 may comprise a calibration circuitry 73 which may form at least part of the above-mentioned control apparatus. The calibration circuitry 73 may be configured to carry out the calibration phase in the server, e.g. any one of the embodiments described in connection with FIGS. 4 to 10. Accordingly, the calibration circuitry 73 may receive the measurement reports from the LTS nodes, determine new operation parameters according to one or more algorithms stored in the memory 72, store the new parameters in the memory 72, and control the I/O interface 76 to transmit the new parameters to the LTS nodes and the mobile tags. The controller circuitry 74 may comprise a processor configured by software read by the processor from the memory unit 72. The memory unit 72 may also store databases needed for the implementation of the LTS and the calibration phase. The databases may comprise an LTS database storing current locations of the tags being location-tracked, a layout of the area in which the location tracking is carried out, etc. The memory 72 may further store a tag database storing identifiers of the tags comprised in the LTS and any personal and/or asset information associated with the tags. The tag database may link the tags to corresponding users and assets. The memory 72 may also store the calibration parameters and computer instructions configuring the calibration circuitry 73 to carry out the calibration phase. The memory 72 may be realized by a single memory device or a plurality of memory devices which may be structurally different including, for example but not limited to, a hard drive, a random access memory, and flash memory. The server 70 may further comprise a user interface 78 comprising a display unit, a keyboard, a mouse, a loudspeaker, and/or similar input and/or output means.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in connection with FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units. As the present invention comprises features in the location tracking apparatus, the access control apparatus, and the mobile tag, each apparatus may be provided with a processor configured by a separate computer program product.

It will be obvious to a person skilled in the art that, as technology advances, the inventive concept can be implemented in various ways. The invention and its embodiments are not limited to the examples described above but may vary within the scope of the claims.

The invention claimed is:

1. A system for tracking location, comprising:
a plurality of location tracking nodes disposed to cover an area where the location tracking is to be carried out;
at least one mobile tag configured to communicate with at least one of said plurality of location tracking nodes at a time for location tracking purposes; and
a control apparatus configured to control operational parameters of the plurality of location tracking nodes and the at least one mobile tag, wherein the control apparatus and the plurality of location tracking nodes are configured to carry out an automatic calibration phase during operation of the location tracking system, wherein the calibration phase comprises:
transmitting a test signal with designated transmission power from one location tracking node;
receiving the test signal in another location tracking node and determining the location tracking node that transmitted the test signal from the test signal;
transmitting to the control apparatus a measurement report comprising an identifier of at least one location tracking node from which the test signal was received;
receiving a plurality of measurement reports from a plurality of location tracking nodes in the control apparatus; and
reconfiguring, by the control apparatus, at least some parameters of at least one location tracking node and/or at least one mobile tag on the basis of the received measurement reports,
wherein the control apparatus is configured to reconfigure transmission power of at least one location tracking node on the basis of the received measurement reports,
wherein the control apparatus is configured to increase the transmission power of a location tracking node whose test signal was not detected in another location tracking node that should have detected the location tracking node and/or decrease the transmission power of a location tracking node whose test signal was detected in another location tracking node that should not ave detected the location tracking node and/or decrease the transmission power of a location tracking node whose test signal was detected in another location tracking node that should not have detected the location tracking node.

2. The system of any preceding claim 1, wherein the control apparatus is configured to reconfigure transmission power of a plurality of location tracking nodes to a level with which a signal is not detected in a neighboring location tracking node, and wherein the plurality of location tracking nodes are configured to utilize the reconfigured transmission power when communicating with the mobile tag and to utilize a higher transmission power when communicating with said neighboring location tracking node.

3. The system of claim 1, wherein the control apparatus is configured to reconfigure transmission power of at least one mobile tag.

4. The system of claim 3, wherein the control apparatus is configured to reconfigure a mobile tag to use the same transmission power as a location tracking node to which the mobile tag is currently linked.

5. The system of claim 1, wherein the control apparatus is configured to reconfigure at least one detection threshold used by the at least one mobile tag in detection of location tracking nodes.

6. The system of claim 5, wherein the control apparatus is configured to reconfigure a rapid detection threshold used by the mobile tag to link to a location tracking node from which a signal is received with a reception power exceeding the rapid detection threshold.

7. The system of claim 6, wherein the control apparatus is configured to reconfigure a rapid detection threshold on the basis of received measurement reports such that in any location of the location tracking system a determined number of location tracking nodes provide a reception power exceeding the rapid detection threshold.

8. The system of any preceding claim 6, wherein the control apparatus is configured to reconfigure a discarding threshold used by the mobile tag to discard a location tracking node from which a signal is received with a reception power below the discarding threshold.

9. The system of claim 1, wherein location tracking nodes form a mesh network providing a communication connection between the mobile tag and the control apparatus, and wherein the control apparatus is configured to determine in the calibration phase on the basis of the received measurement reports new routes to be used in routing signals between the mobile tag and the control apparatus, and to configure at least some of the location tracking nodes to apply the new routes.

10. The system of claim 1, wherein the plurality of location tracking nodes are configured to transmit the test signal with plurality of transmission power levels, and wherein the control apparatus is configured to determine which neighboring location tracking nodes each location tracking node is able to detect at each transmission power level, and to reconfigure the parameters on the basis of said determination.

11. An apparatus for a location tracking system, comprising:
at least one processor; and
at least one memory including a computer program code, wherein the at least one memory and the computer program code are configured, with the at least one processor, to cause the apparatus to perform the following in an automatic calibration phase during operation of the location tracking system:
transmit a test signal with at least one designated transmission power from the location tracking node;
receive another test signal from another location tracking node and determining the location tracking node that transmitted the other test signal from the test signal;
transmit to a control apparatus a measurement report comprising an identifier of at least one location tracking node from which the test signal was received;
receive reconfigured transmission power parameters from the control apparatus; and
apply the received reconfigured transmission power parameters in communication with mobile tags tracked by the location tracking system,
wherein the control apparatus is configured to reconfigure transmission power of the at least one location tracking node on the basis of the received measurement reports,
wherein the control apparatus is configured to increase the transmission power of a location tracking node whose test signal was not detected in another location tracking node that should have detected the location tracking node and/or decrease the transmission power of a location tracking node whose test signal was detected in another location tracking node that should not have detected the location tracking node and/or decrease the transmission power of a location tracking node whose test signal was detected in another location tracking node that should not have detected the location tracking node.

12. A control apparatus comprising:
at least one processor; and
at least one memory including a computer program code, wherein the at least one memory and the computer program code are configured, with the at least one processor, to cause the apparatus to control operational parameters of a location tracking system comprising a plurality of location tracking nodes disposed to cover an area where the location tracking is to be carried out and at least one mobile tag configured to communicate with at least one of said plurality of location tracking nodes at a time for location tracking purposes, to carry out an automatic calibration phase during operation of the location tracking system, the calibration phase comprising transmission of test signals with designated transmission power levels between said plurality of location tracking nodes,
receive measurement reports during the calibration phase from the plurality of location tracking nodes, wherein the measurement report comprises an identifier of at least one location tracking node from which the test signal was received by a location tracking node which transmitted said measurement report,
analyze said plurality of measurement reports,
reconfigure at least some parameters of at least one location tracking node and/or at least one mobile tag on the basis of the analysis,
reconfigure transmission power of at least one location tracking node on the basis of the analysis, and
increase the transmission power of a location tracking node whose test signal was not detected in another location tracking node that should have detected the location tracking node and/or decrease the transmission power of a location tracking node whose test signal was detected in another location tracking node that should not have detected the location tracking node and/or decrease the transmission power of a location tracking node whose test signal was detected in another location tracking node that should not have detected the location tracking node.

* * * * *